Patented Oct. 12, 1926.

1,602,412

UNITED STATES PATENT OFFICE.

WILLIAM B. RUNYAN, OF DAYTON, OHIO, ASSIGNOR TO THE DAYTON MALLEABLE IRON COMPANY, OF DAYTON, OHIO, A CORPORATION OF OHIO.

METHOD OF TREATING MOLDING SAND.

No Drawing.   Application filed January 9, 1924. Serial No. 685,187.

This invention relates to the treatment of the sand used in making molds.

One of the principal objects of the invention is to provide a method of treating a sand which is unfitted for the making of molds so as to fit that sand for such use.

Another object of the invention is to provide a method of treating sand, such as previously used molding sand, core sand or the like, to give to that sand such a coating of a bonding material as will make the treated sand function as a satisfactory molding sand.

Other objects and advantages of the invention will be apparent from the description thereof set out below.

As is well known not every type of sand which occurs in nature will function satisfactorily in the making of molds such as are used in foundary work. In fact the supply of sand which is suitable for this purpose is limited, these sands being found only in widely scattered locations, and in limited quantities. Consequently the price of these sands is comparatively high.

In ordinary green sand molding these special sands which are used are of such character that when properly moistened the sand will stick together so that sharp cut cavities for the forming of the casting may be secured. But with use the sand tends to lose the cohesive properties which cause it to properly bond, so that in actual foundary work, as heretofore practiced, it has been necessary to throw away some of the sand, from time to time, and add fresh sand to take its place. And because of the high price of molding sand this is an expensive thing.

I have also found that if the spent molding sand is so treated as to recoat it with a thin layer of plastic material analogous to that with which it was originally coated, the treated sand will function just as satisfactorily in the making of molds as will fresh molding sand. In fact it will function more satisfactorily for in treated sand the grains of sand are given just the right coating to make it function to best advantage, without the accumulation of any bonding material which is not an actual coating for the sand grains; whereas in naturally occuring molding sand the bonding material is unevenly distributed through the mass of sand and is also admixed with undesirable impurities. The accumulated deposits of bonding material, which is not a coating for the grains of sand, serve no useful purpose as a bonding agent, and are objectionable because they interfere with the making of perfect castings. In treating the sand to recoat it with a layer of this plastic material, I agitate a fine grained, refractory plastic clay, such as a Ball clay, in water to separate the fine particles of clay and suspend these separated particles in the water. A suitable clay of this character will be composed of such fine particles that when thus separated it will act substantially as a colloidal suspension, the particles being so small that they will remain in suspension for an appreciable time. This water, with the clay in suspension therein, is sprinkled over the spent molding sand, the water, carrying the fine particles of clay, finding its way throughout the mass of sand and covering the various grains of sand with a coating which is of the same general character as the coating which the sand originally carried.

As thus treated the sand becomes even more effective than when it was first used, and by thus treating the sand the same batch of sand may be used over and over again without the necessity of throwing any away and without the necessity of adding any additional sand, except as such small amounts may be needed from time to time to replace the shrinkage which naturally results during use.

Not only may spent molding sand have its bonding characteristics restored, but spent core sand may be treated to give it a layer of bonding material and may then also be satisfactorily used in the making of molds.

This method may even be applied to some sands which, in their natural state, are not at all adapted for the making of green sand molds. When properly coated, as described above, such sands may function very satisfactorily as molding sand.

While the method herein described, constitutes a preferred embodiment of the invention, it is to be understood that the invention it not limited to this precise method, and that changes may be made therein without departing from the scope of the invention which is defined in the appended claim.

What is claimed is:

The process of treating spent molding sand to restore to it its original binding characteristics, which consists in agitating a finely divided plastic clay in water to place the clay in suspension within the water, and sprinkling the water with its suspended clay over the spent sand to coat the grains of that sand with a layer of plastic clay.

In testimony whereof I hereto affix my signature.

WILLIAM B. RUNYAN.